United States Patent
Czemske et al.

(10) Patent No.: US 11,383,566 B2
(45) Date of Patent: Jul. 12, 2022

(54) GREASE APPLICATOR FOR TRAILER HITCH TOW BALL

(71) Applicants: Michael Czemske, Brookfield, IL (US); Gregory Smith, Geneva, IL (US); Christopher Kozlik, Aurora, IL (US)

(72) Inventors: Michael Czemske, Brookfield, IL (US); Gregory Smith, Geneva, IL (US); Christopher Kozlik, Aurora, IL (US)

(73) Assignee: Michael Czemske, Brookfield, IL (US)

(*) Notice: Subject to any disclaimer, the term of this patent is extended or adjusted under 35 U.S.C. 154(b) by 35 days.

(21) Appl. No.: 16/550,923

(22) Filed: Aug. 26, 2019

(65) Prior Publication Data
US 2020/0086704 A1    Mar. 19, 2020

Related U.S. Application Data

(60) Provisional application No. 62/722,634, filed on Aug. 24, 2018.

(51) Int. Cl.
*B60D 1/58*    (2006.01)
*B60D 1/06*    (2006.01)

(52) U.S. Cl.
CPC ............... *B60D 1/586* (2013.01); *B60D 1/06* (2013.01)

(58) Field of Classification Search
CPC .......... B60D 1/586; B60D 1/06; B60R 17/00; F16N 3/08; F16N 3/10; F16N 11/02; F16N 13/08; F16N 19/00

USPC ........................................................ 280/511
See application file for complete search history.

(56) References Cited

U.S. PATENT DOCUMENTS

| | | | |
|---|---|---|---|
| 1,638,941 A * | 8/1927 | Lea | B60R 17/00 184/88.1 |
| 4,509,656 A | 4/1985 | Rosler | |
| 5,588,525 A | 12/1996 | Rosler | |
| 5,680,949 A | 10/1997 | Roesler | |
| 8,789,694 B2 | 7/2014 | Roesler | |
| 9,540,152 B2 | 1/2017 | Roesler | |
| 9,630,744 B2 | 4/2017 | Wolfgang | |

FOREIGN PATENT DOCUMENTS

DE    102009018231    9/2010

* cited by examiner

*Primary Examiner* — Kevin Hurley
*Assistant Examiner* — Hosam Shabara
(74) *Attorney, Agent, or Firm* — von Briesen & Roper, s.c.

(57) ABSTRACT

The claimed invention relates to a container assembly for applying grease to the ball of a trailer hitch. Specifically, the grease applicator comprises a lower housing with an upper concave surface and an upper housing with an upper concave surface further comprising at least one aperture. Grease is introduced between the upper concave surface of the lower housing and the upper concave surface of the upper housing such that when the two surfaces are pressed together grease is emitted from the at least one aperture in the upper concave surface.

9 Claims, 11 Drawing Sheets

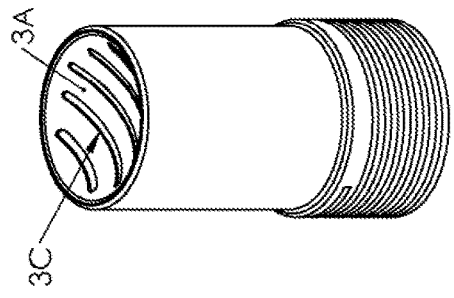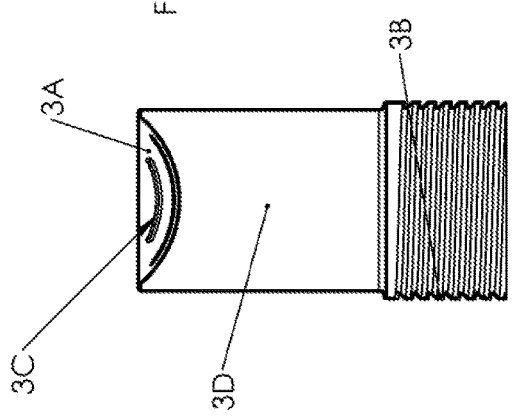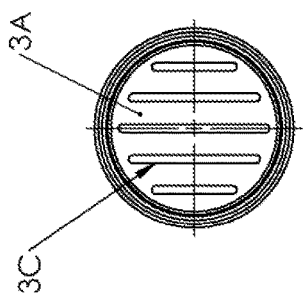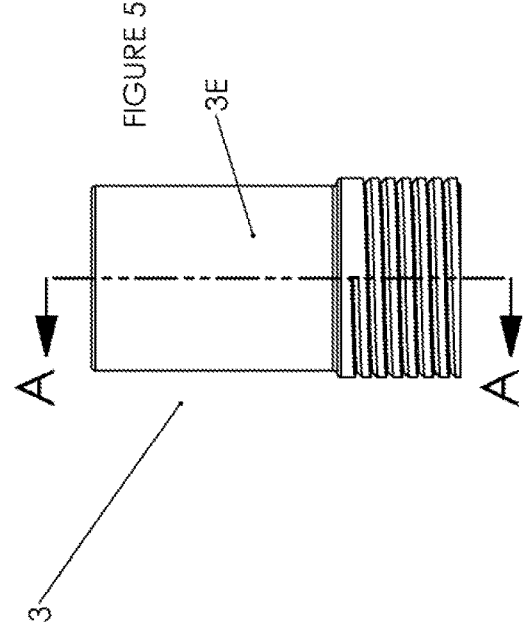

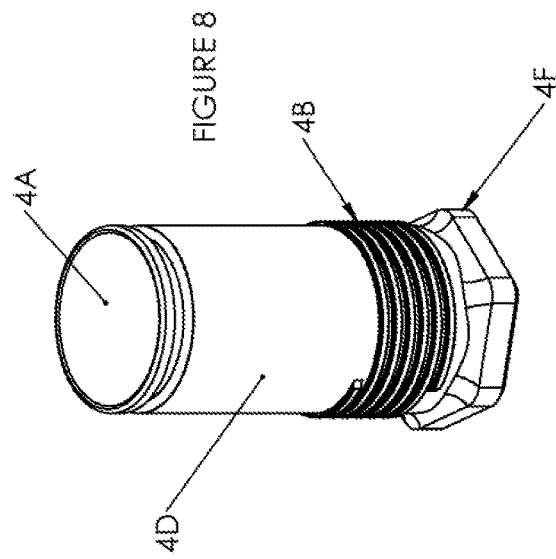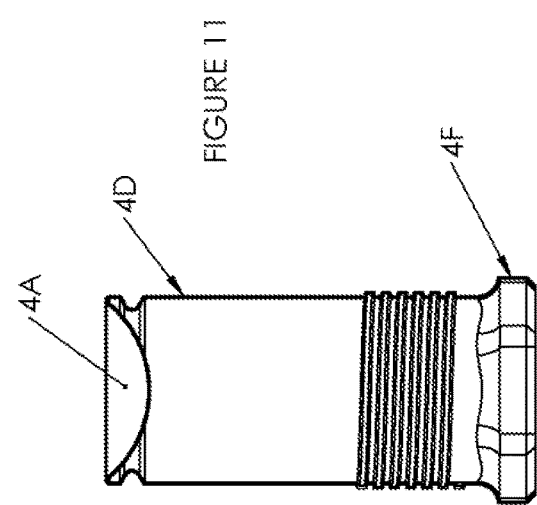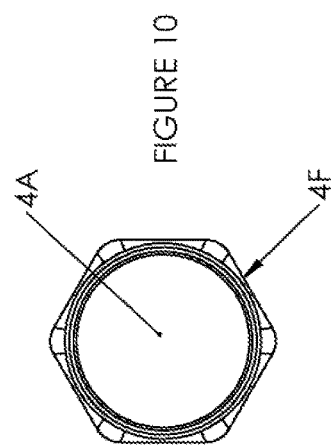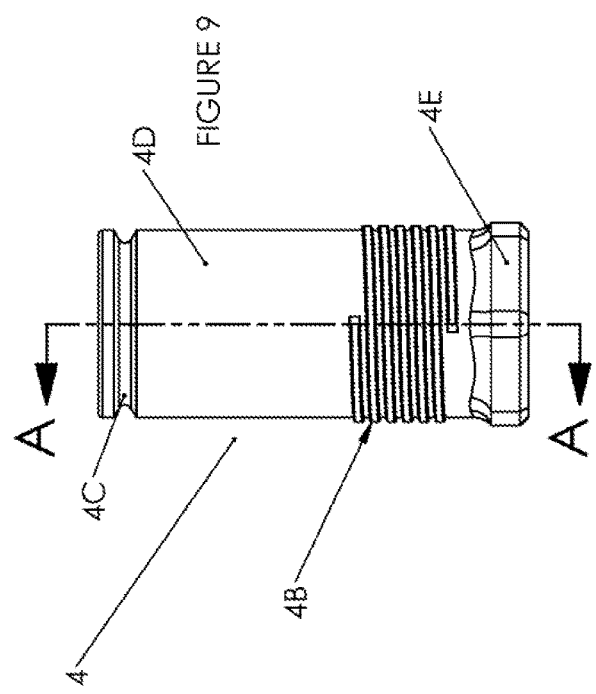

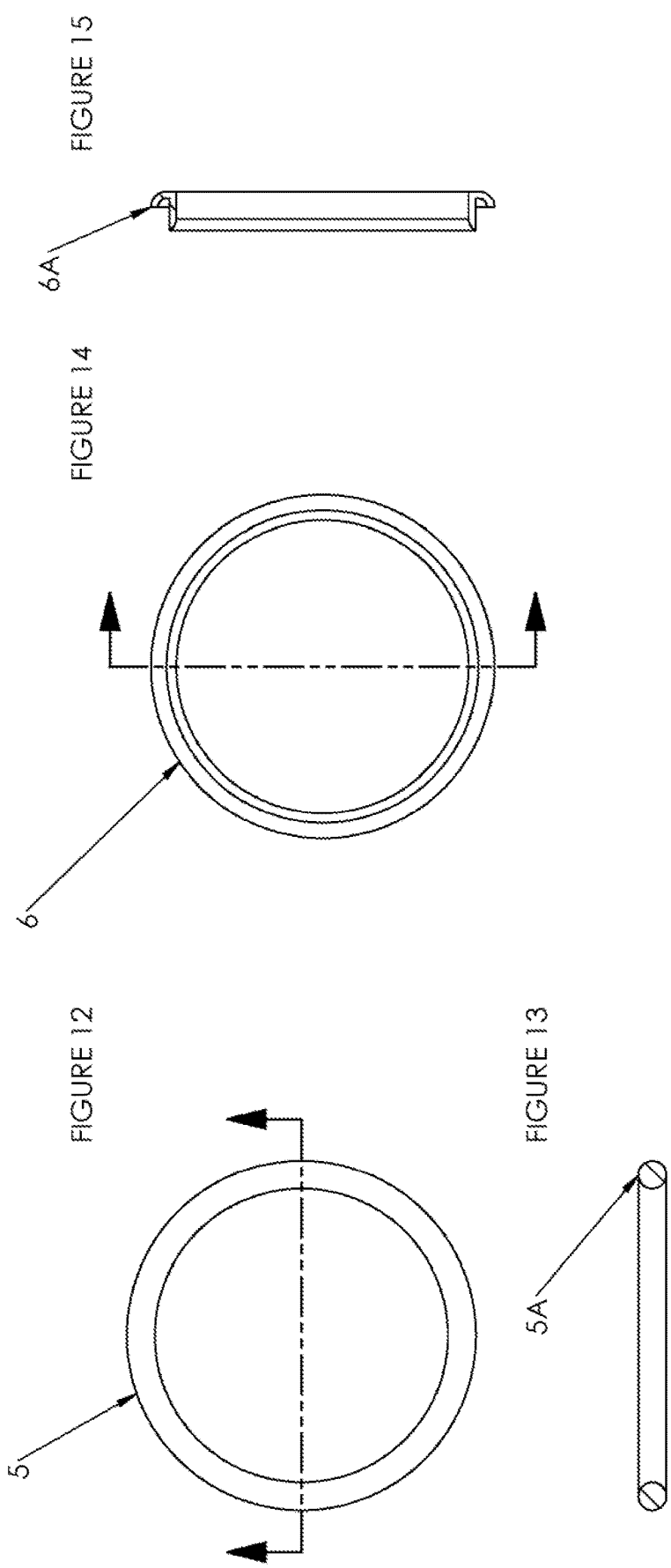

FIGURE 16
FIGURE 17
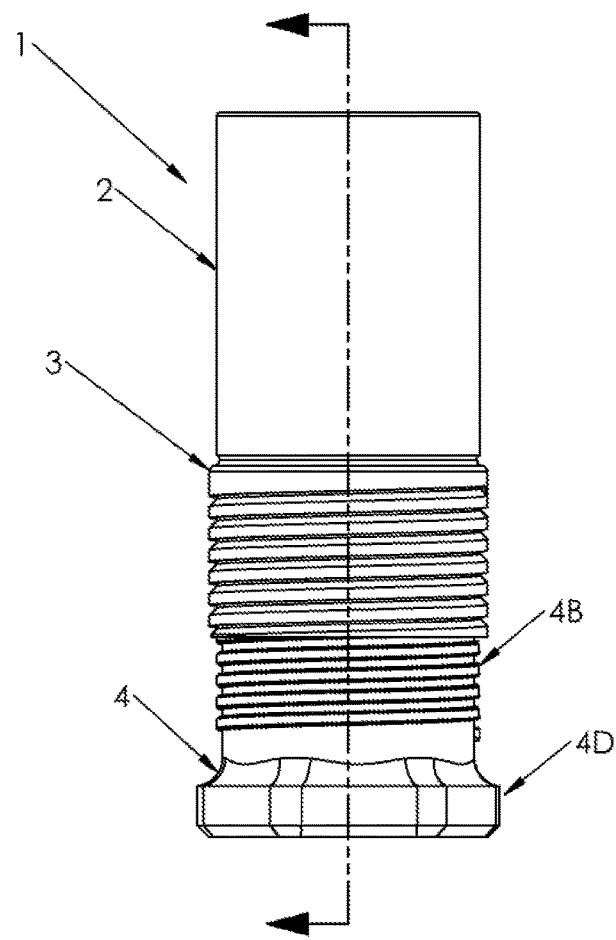
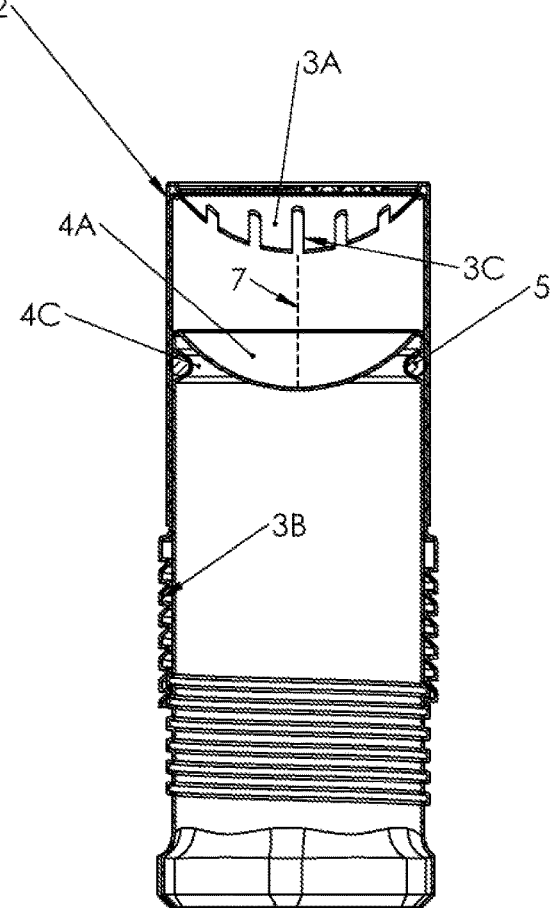

FIGURE 18
FIGURE 19
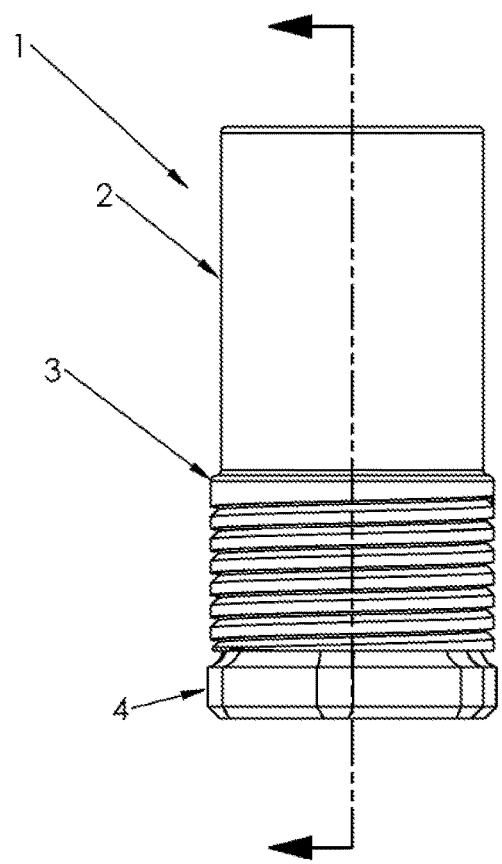
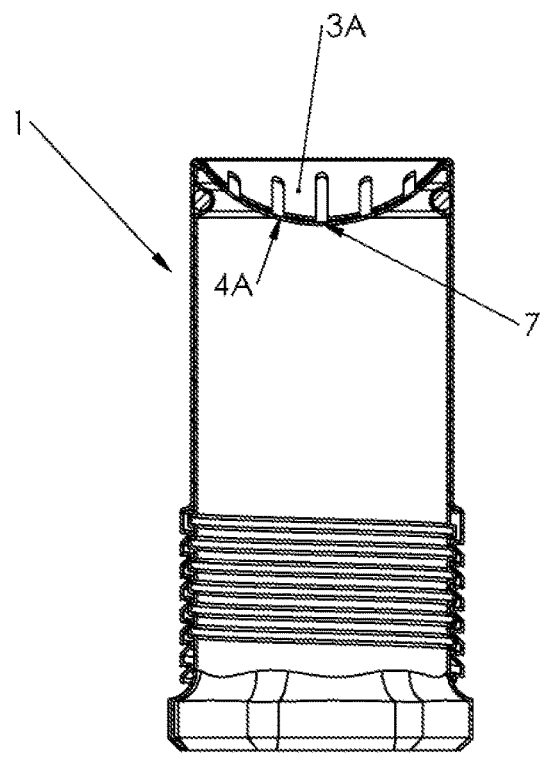

FIGURE 22
FIGURE 23
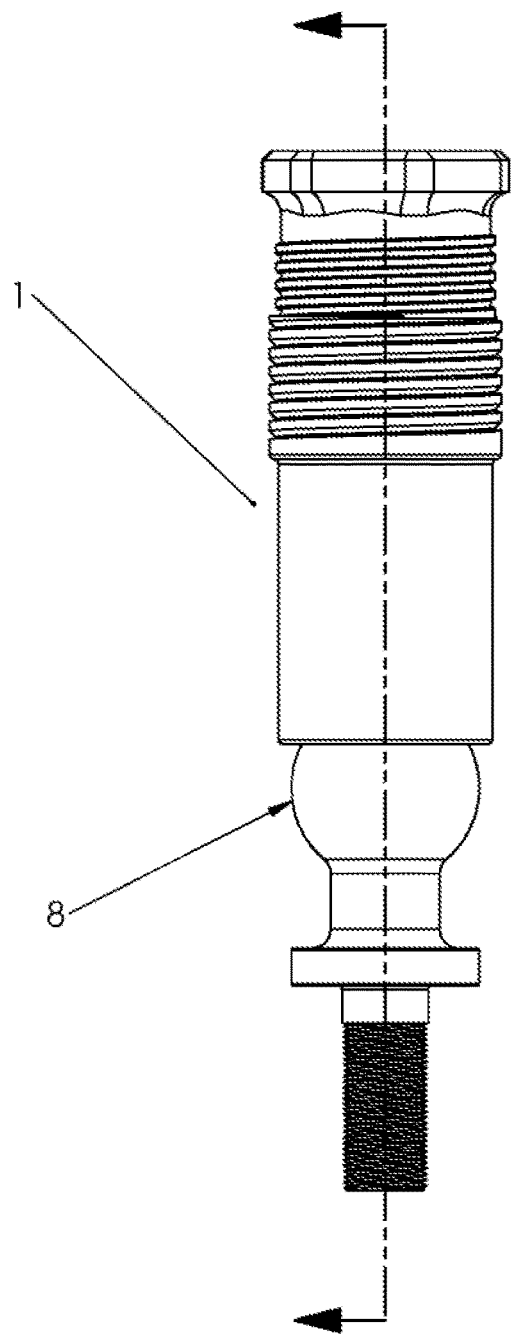
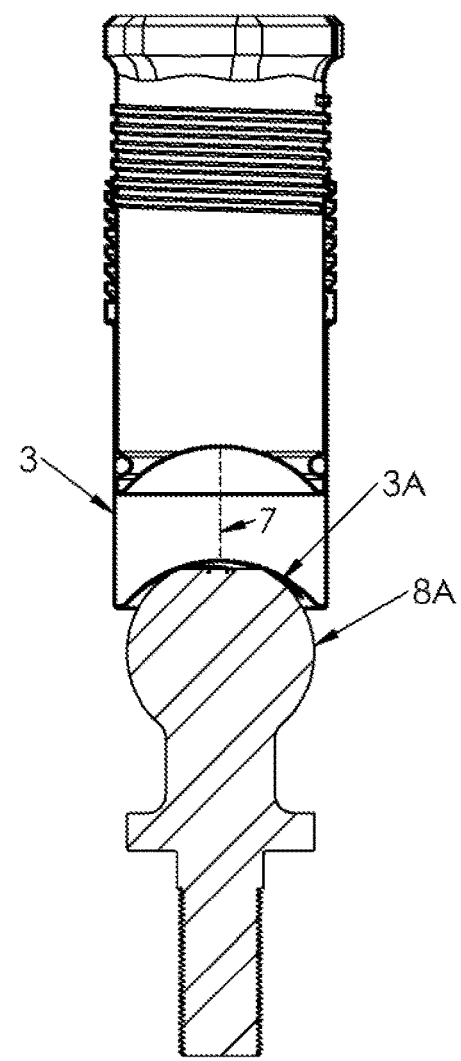

FIGURE 24
FIGURE 25
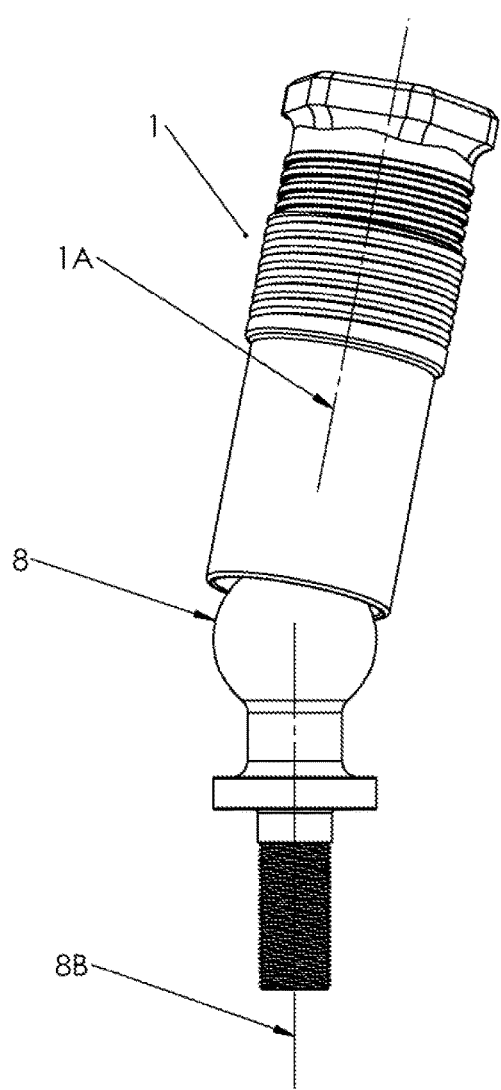
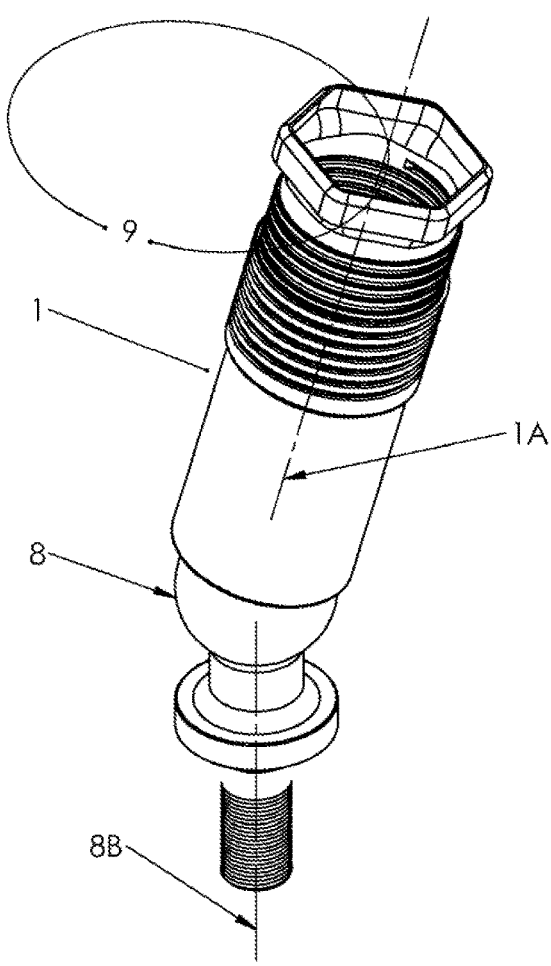

US 11,383,566 B2

GREASE APPLICATOR FOR TRAILER HITCH TOW BALL

FIELD OF THE INVENTION

The claimed invention relates generally to a container assembly. More specifically, the claimed invention relates to a container assembly for applying grease to the ball of a trailer hitch.

BACKGROUND OF THE INVENTION

A variety of trailers and other types of vehicles are often towed behind cars, trucks, and other types of motor vehicles using a device commonly referred to as a tow hitch. The tow hitch often has a fixed tow ball attached to the rear bumper, frame member, or uni-body of the tow vehicle. The vehicle being towed often has a mating female tow hitch receiver that mounts over the tow ball and, when locked, prevents disengagement from the tow ball while still allowing some movement about the tow ball. The female receiver is constructed to allow the towed vehicle to pivot about the fixed ball horizontally as well as vertically, or any combination thereof.

The vehicle being towed may weigh thousands of pounds and often imparts significant loads to the tow ball where a concave surface in the receiver contacts the convex surface of the tow ball. Thus the tow ball must be lubricated with sufficient volume and quality of grease to prevent seizure of the hitch to the tow ball and insure intended free movement of the towed vehicle relative to the towing vehicle.

Manufacturers of tow hitches recommend that the tow ball be lubricated sufficiently each and every time with high-quality grease prior to the female hitch being installed. Lithium grease or another suitable type of grease is often dispensed from a squeeze type tube onto a make-shift applicator comprising a cloth, rag, paper towel, sponge or other suitable material. The applicator material is then cupped in the hand of the person applying the grease and the grease is transferred from the applicator material onto the tow ball. The grease often permeates the application material and is transferred to the hands of the person using the applicator material unless said person takes the additional step of wearing a non-porous glove. The applicator material and glove are most often discarded but may be stored and reused at the risk of getting the grease on hands and clothing.

BRIEF DESCRIPTION OF THE DRAWINGS

FIG. 4 is an isometric top view of the upper housing of a tow ball grease applicator.

FIG. 5 is a side view of the upper housing of a tow ball grease applicator.

FIG. 6 is a top view of the upper housing of a tow ball grease applicator.

FIG. 7 is a section view of the upper housing of a tow ball grease applicator.

FIG. 8 is an isometric top view of the lower housing of a tow ball grease applicator.

FIG. 9 is a side view of the lower housing of a tow ball grease applicator.

FIG. 10 is a top view of the lower housing of a tow ball grease applicator.

FIG. 11 is a section view of the lower housing of a tow ball grease applicator.

FIG. 12 is a top view of a seal used with the tow ball grease applicator.

FIG. 13 is a section view of a seal used with the tow ball grease applicator.

FIG. 14 is a top view of another type of seal that can be used with the tow ball grease applicator.

FIG. 15 is a section view of another type of seal that can be used with the tow ball grease applicator.

FIG. 16 is a side view of a tow ball grease applicator in an expanded configuration.

FIG. 17 is a section view of a tow ball grease applicator in an expanded configuration.

FIG. 18 is a side view of a tow ball grease applicator in a compacted configuration.

FIG. 19 is a section view of a tow ball grease applicator in a compacted configuration.

FIG. 22 is a side view of a tow ball grease applicator aligned vertically with the central axis of a tow ball.

FIG. 23 is a section view of a tow ball grease applicator aligned vertically with the central axis of a tow ball.

FIG. 24 is a side view of a tow ball grease applicator aligned at an angle relative to the central axis of a tow ball.

FIG. 25 is an isometric view of a tow ball grease applicator aligned at an angle relative to the central axis of a tow ball.

DETAILED DESCRIPTION OF THE INVENTION

Figure 1:
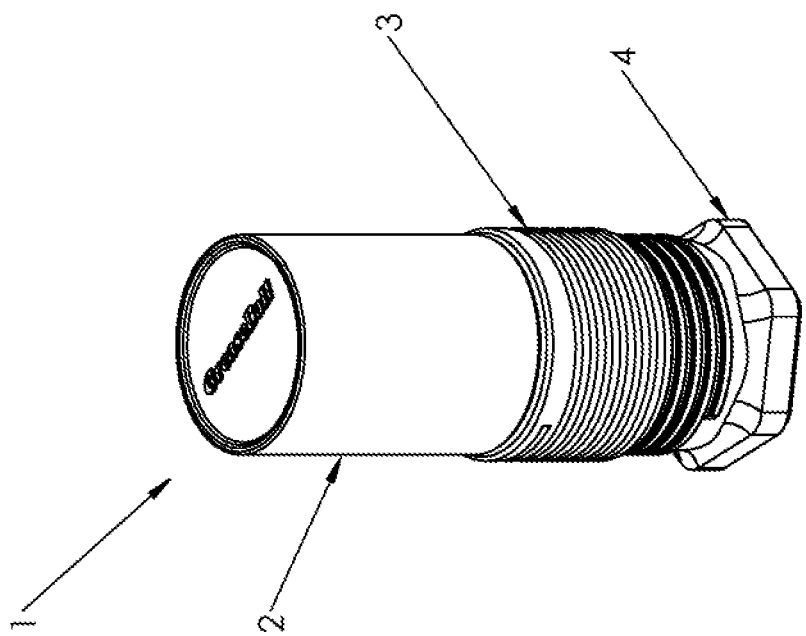
FIG. 1 is an isometric top view of a tow ball grease applicator in an expanded configuration.
Figure 2:
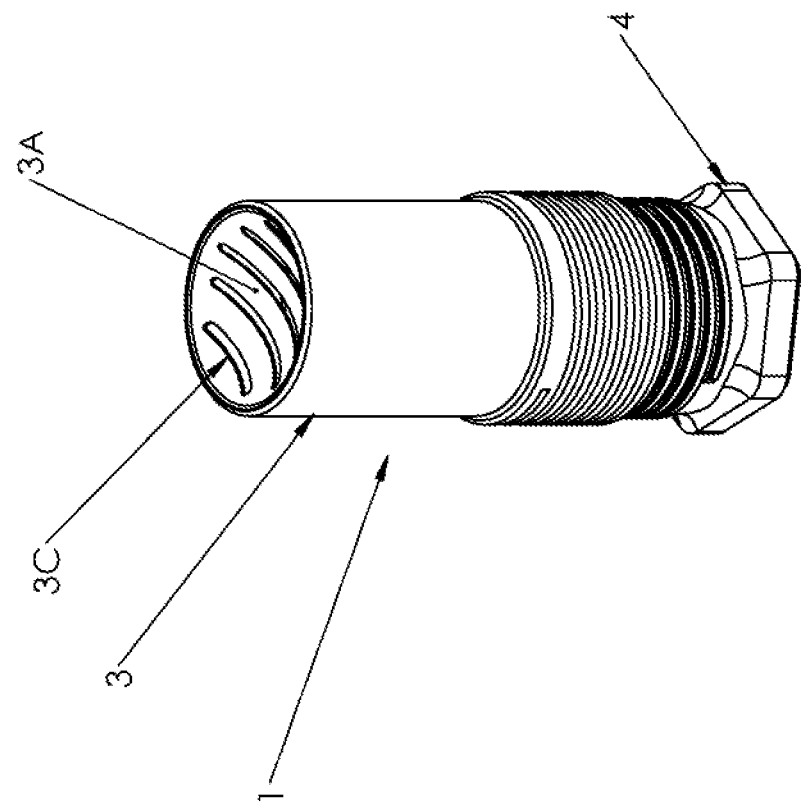
FIG. 2 is an isometric top view of a tow ball grease applicator in an expanded configuration with the dust cap removed.
Figure 3:
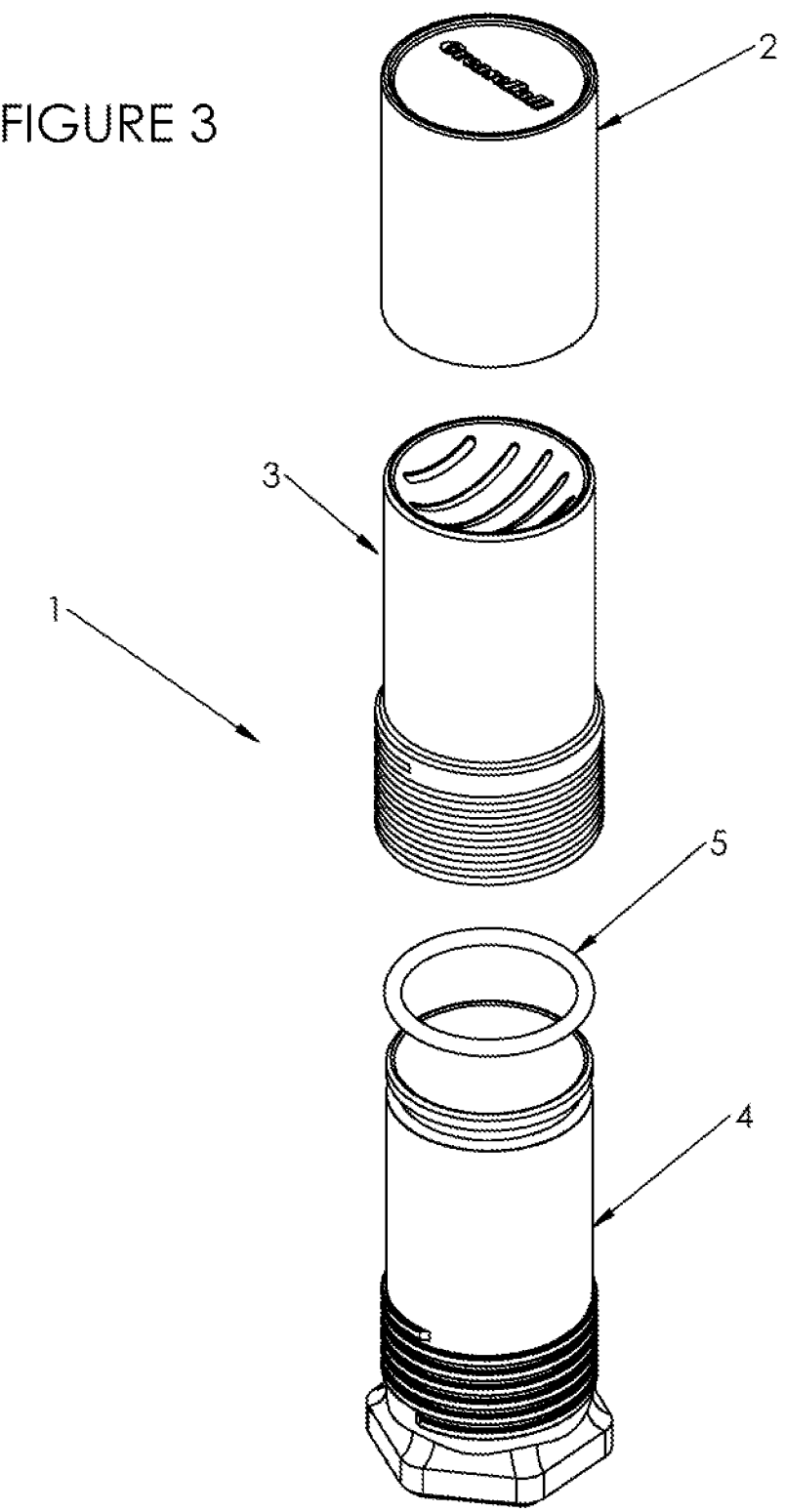
FIG. 3 is an isometric top view of a tow ball grease applicator in an exploded view.

Referring now to the drawings, wherein like reference numerals refer to like elements throughout, FIG. 1 shows one example of the claimed trailer hitch tow ball grease applicator 1. Referring now to FIGS. 1, 2, & 3, in a first preferred embodiment, the trailer hitch tow ball grease applicator 1 comprises an upper housing 3, a lower housing 4, a seal 5, and may further comprise a dust cap 2. Referring to FIGS. 2, 4, & 7, upper housing has a concave surface 3A, and at least one aperture 3C extending through the concave wall at a generally closed distal end. Aperture may comprise one or more circular holes, slots, non-uniform geometric shapes or any combination thereof. Concave surface 3A corresponds to or has a greater radius than the radius of a trailer hitch tow ball and may be made from a flexible material so that it conforms to the radius present on the tow ball.

Referring to FIGS. 5 & 7, upper housing has a generally cylindrically shaped exterior surface 3E and a generally cylindrically shaped interior surface 3D extending from concave surface 3A to internal threaded bore 3B at or near the opposite end of the upper housing.

Referring to FIGS. 8, 9, 7, 10 & 11, lower housing has a generally cylindrically shaped exterior surface 4D extending from concave surface 4A to externally threaded surface 4B at or near the opposite end. Lower housing further comprises reduced diameter 4C adjacent exterior surface 4D. Reduced diameter 4C may comprise a groove or may terminate at concave surface 4A. Lower housing further comprises grip surface 4F at or near the end opposite the generally closed end. Grip surface 4F is shown as having a polygonal shape having 6 sides. It is generally understood that grip surface have any number of sides, may be generally round, oval, or may comprise any shape suitable to be gripped by the hand.

Referring to FIGS. 12, 13, 14, & 15 seal 5 and/or 6 is used to prevent leakage of grease. It is generally understood that seal may utilize a round cross section 5A as commonly found in an O-ring, or may utilize a non-circular cross section 6A.

Male thread 4B of lower housing 4 engages at least ¾ turn of full female thread 3B on upper housing 3. Expanded distance 6 is therefore the maximum distance between the concave surface 4A on lower housing 4 and concave surface 3A on upper housing 3 and represents the maximum volume of grease that can be held within applicator 1 in an expanded position.

Referring to FIGS. 18 & 19, the male thread 4B of lower housing 4 engages at female thread 3B on upper housing 3 and may be rotated until inside surface formed by wall of concave surface 3A of upper housing abuts concave surface 4A of lower housing 4, or other interference occurs. Compacted distance 6 is therefore the minimum distance between the concave surface 4A on lower housing 4 and concave surface 3A on upper housing 3 and represents the minimum volume of grease that is retained within applicator 1 in a contracted position. Lower housing 4 may be removed from upper housing 3 by reversing the direction of threading until the parts may be separated. If desired, upper housing 3 may be refilled with grease, and lower housing 4 may be re-inserted and into upper housing 3 and threaded together at least ¾ of a full turn. In an alternate preferred embodiment, grease applicator 1 may be made from recyclable materials and may be disposed of for possible recycling. In yet another embodiment, at least one of the upper housing and the lower housing is formed by plastic molding. The plastic molding method for the upper housing and the lower housing comprises at least one of injecting molding, blow molding, or vacuum forming.

Figure 20:
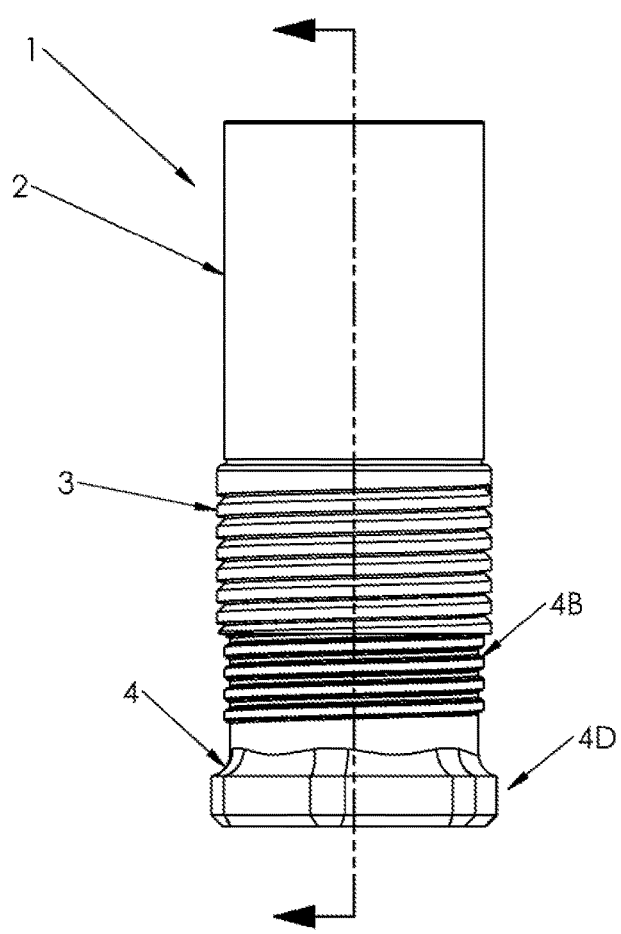
FIG. 20 is a side view of a tow ball grease applicator having a concave dust cap and an alternate seal in an expanded configuration.
Figure 21:
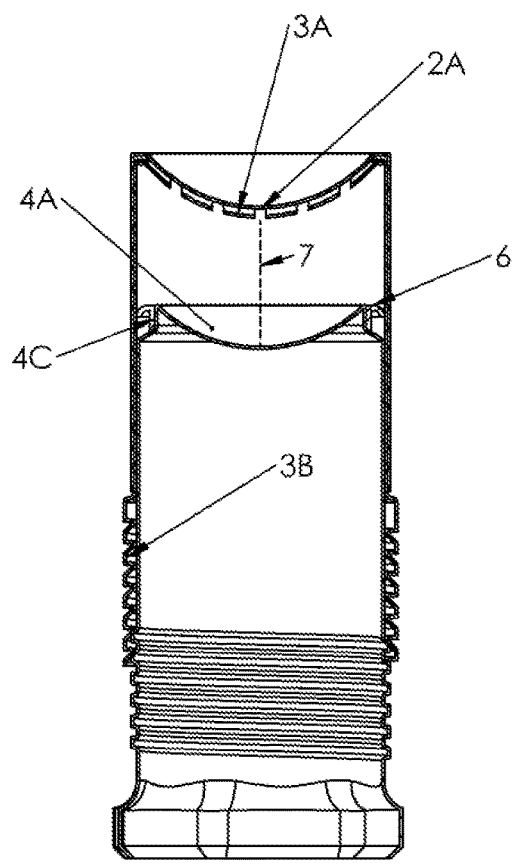
FIG. 21 is a section view of a tow ball grease applicator having a concave dust cap and an alternate seal in an expanded configuration.

Referring to FIGS. 20 & 21, an alternate embodiment is shown with a dust cap 2 having a convex inner wall 2A that corresponds to concave surface 3A on upper housing 3. When dust cap 2 is mounted over upper housing 3, convex surface 2A may provide a seal against concave surface 3A. Grease or other suitable lubricant may be heated to a temperature that reduces the viscosity from a paste, gel, or quasi-solid into a liquid and then may be poured into upper housing until the desired amount is achieved. Lower housing 4 may then be partially threaded into upper housing 3 and the completed grease applicator 1 is ready for use. Before use, dust cap 2 is removed from grease applicator 1. After use, dust cap 1 may be mounted over upper housing 3 to prevent contamination of the grease by dirt, debris, water, or other non-desirable materials.

Referring to FIGS. 22 & 23, the person using the applicator 1 orients the applicator generally vertically so that the concave application surface 3A contacts tow ball 8 and hold applicators 1 by upper housing 3. Grip surface 4D of lower housing 4 is then rotated so that male thread 4B further engages female thread 3B of upper housing 3 so that distance 6 is reduced and a controlled amount of grease flows through apertures 3C onto concave surface 3A and then radius 8A of tow ball 8. In another preferred embodiment the person using the applicator 1 holds applicators 1 by upper housing 3. Grip surface 4D of lower housing 4 is then rotated so that male thread 4B further engages female thread 3B of upper housing 3 so that distance 6 is reduced and a controlled amount of grease flows through apertures 3C onto concave surface 3A. Applicator 1 is then rotated by the user until concave surface 3A generally faces tow ball 8 and concave surface 3A is brought into contact with radius 8A of tow ball 8 and grease transferred from applicator 1 to tow ball 8.

Referring to FIGS. 24 & 25, in one preferred embodiment, grease applicator 1 is oriented so that its central axis 1A is at an angle relative to the central axis 8B of tow ball 8. Applicator may be rotated along path 9 about central axis 8B of tow ball 8 to insure that grease is adequately transferred to radius surface 8A of tow ball 8.

While the invention has been described with reference to specific embodiments, the description is illustrative of the invention and is not to be construed as limiting. Various modifications and applications of the invention may occur to those with skill in the art without departing from the spirit and scope of the invention.

What is claimed is:

1. A device for lubricating the tow ball of a trailer hitch comprising:
   a generally cylindrical upper housing comprising a generally closed end, an opposing open end, an internal female thread disposed at the open end, and a connecting portion there between, said generally closed end having a concave external surface and a complimentary offset convex internal surface comprising at least one passageway connecting the concave external surface and the convex internal surface;
   a generally cylindrical lower housing comprising a concave first end, an external male thread disposed around the cylindrical lower housing at a second end, and a connecting portion there between, said lower housing being mounted at least partially within said upper housing so that male thread of lower housing engages female thread of upper housing, and wherein the lower housing and upper housing form a chamber between the internal surface of upper housing and the concave end of lower housing;
   a seal interposed between the generally cylindrical upper housing and the generally cylindrical lower housing, the seal being disposed near the concave end of lower lousing.

2. The lubricating device according to claim 1 wherein lower housing includes an external grip surface adjacent the external male thread.

3. The lubricating device according to claim 1 wherein the seal is integrally formed in lower housing.

4. The lubricating device according to claim 1 wherein the seal further comprises an O-ring having a circular cross section.

5. The lubricating device according to claim 1 wherein the seal further comprises an O-ring having a non-circular cross section.

6. The lubricating device according to claim 1 wherein a removable and replaceable cap is positioned over the generally closed end of upper housing.

7. The lubricating device according to claim 6 wherein the removable and replaceable cap comprises a concave external face and an opposing convex internal face.

8. The lubricating device according to claim 1 wherein at least one of upper housing and lower housing is formed by plastic molding.

9. The lubricating device according to claim 8 wherein at least one of upper housing and lower housing is formed by plastic molding wherein plastic molding method comprises at least one of injecting molding, blow molding, or vacuum forming.

\* \* \* \* \*